(12) United States Patent
Bastide et al.

(10) Patent No.: US 10,542,113 B2
(45) Date of Patent: Jan. 21, 2020

(54) SOCIAL NETWORK CONTENT PRIORITIZATION

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 15/202,591

(22) Filed: Jul. 6, 2016

(65) Prior Publication Data
US 2018/0011853 A1 Jan. 11, 2018

(51) Int. Cl.
*H04L 29/08* (2006.01)
*G06F 16/951* (2019.01)
*G06Q 50/00* (2012.01)

(52) U.S. Cl.
CPC .......... *H04L 67/306* (2013.01); *H04L 67/327* (2013.01)

(58) Field of Classification Search
CPC ... H04L 67/306; H04L 67/327; G06F 16/951; G06Q 50/01
USPC ........................................................ 707/723
See application file for complete search history.

(56) References Cited

U.S. PATENT DOCUMENTS

| | | | |
|---|---|---|---|
| 6,925,605 B2 | 8/2005 | Bates et al. | |
| 7,136,710 B1 | 11/2006 | Hoffberg et al. | |
| 7,437,382 B2* | 10/2008 | Zhang | H04L 51/26 |
| 7,844,666 B2 | 11/2010 | Horvitz et al. | |
| 7,904,399 B2 | 3/2011 | Subramaniam et al. | |
| 7,917,587 B2* | 3/2011 | Zeng | G06Q 10/107 709/206 |
| 7,933,961 B2 | 4/2011 | Mandel et al. | |
| 8,572,094 B2* | 10/2013 | Luo | G06Q 10/10 707/748 |
| 8,688,701 B2* | 4/2014 | Ghosh | G06Q 30/02 707/736 |
| 8,719,178 B2* | 5/2014 | Zhang | G06Q 50/01 705/319 |
| 8,943,134 B2 | 1/2015 | Reis et al. | |
| 8,949,357 B2 | 2/2015 | Bradshaw | |

(Continued)

OTHER PUBLICATIONS

Ajmera, Jitendra, et al., "A CRM system for Social Media", WWW 2013, Rio de Janeiro, Brazil, May 13-17, 2013, pp. 49-58.*

(Continued)

*Primary Examiner* — Robert Stevens
(74) *Attorney, Agent, or Firm* — Stephen R. Yoder; Gilbert Harmon, Jr.

(57) ABSTRACT

A method includes receiving one or more social networking updates, identifying update information corresponding to each of the one or more social networking updates, wherein update information includes at least user information, interaction information, and time information, calculating a prioritization score for each of the one or more social networking updates according to the identified update information, prioritizing the one or more updates based on the calculated prioritization scores, and displaying the one or more updates according to the prioritization. A computer program product and computer system corresponding to the method are also disclosed.

20 Claims, 6 Drawing Sheets

(56) References Cited

U.S. PATENT DOCUMENTS

| | | | |
|---|---|---|---|
| 9,177,065 B1 | 11/2015 | Ben-Yair et al. | |
| 9,218,630 B2* | 12/2015 | Yang | G06Q 50/01 |
| 9,223,835 B1 | 12/2015 | Mazniker et al. | |
| 9,324,112 B2* | 4/2016 | Bailey | G06F 16/9535 |
| 9,875,286 B1* | 1/2018 | Lewis | G06F 16/24578 |
| 9,953,086 B2 | 4/2018 | Brodie et al. | |
| 2003/0139902 A1 | 7/2003 | Geib et al. | |
| 2010/0121849 A1 | 5/2010 | Goeldi | |
| 2011/0125924 A1 | 5/2011 | McAleer | |
| 2012/0072408 A1* | 3/2012 | Carmel | G06F 16/951 |
| | | | 707/709 |
| 2012/0089681 A1* | 4/2012 | Chowdhury | H04L 12/6418 |
| | | | 709/206 |
| 2012/0284251 A1* | 11/2012 | Haas | G06F 16/951 |
| | | | 707/709 |
| 2013/0018955 A1 | 1/2013 | Thaxton et al. | |
| 2013/0212047 A1* | 8/2013 | Lai | G06Q 10/107 |
| | | | 706/12 |
| 2014/0006400 A1 | 1/2014 | Bastide et al. | |
| 2014/0052540 A1 | 2/2014 | Rajaram et al. | |
| 2014/0201272 A1* | 7/2014 | Perry | G06F 3/0484 |
| | | | 709/204 |
| 2014/0280890 A1 | 9/2014 | Yi et al. | |
| 2014/0359009 A1* | 12/2014 | Shih | H04L 67/306 |
| | | | 709/204 |
| 2015/0026119 A1* | 1/2015 | Fischer | G06Q 10/00 |
| | | | 707/609 |
| 2015/0120717 A1 | 4/2015 | Kim et al. | |
| 2015/0269155 A1 | 9/2015 | Bastide et al. | |
| 2015/0269160 A1 | 9/2015 | Babaian et al. | |
| 2015/0347593 A1* | 12/2015 | Tsai | G06F 16/9535 |
| | | | 707/722 |
| 2015/0347596 A1 | 12/2015 | Mandel et al. | |
| 2015/0379113 A1* | 12/2015 | Wang | H04L 67/306 |
| | | | 707/738 |
| 2015/0381555 A1 | 12/2015 | Faller et al. | |
| 2016/0259790 A1* | 9/2016 | Mashiach | G06F 16/9535 |
| 2017/0031915 A1* | 2/2017 | Moxon | G06F 16/24578 |
| 2017/0093783 A1* | 3/2017 | Sachidanandam | H04L 51/10 |
| 2017/0139919 A1* | 5/2017 | Ball | G06F 16/248 |
| 2017/0139921 A1* | 5/2017 | Ball | G06F 16/24578 |
| 2017/0142044 A1* | 5/2017 | Ball | G06F 16/23 |
| 2017/0351678 A1* | 12/2017 | Selekman | H04L 67/306 |
| 2018/0107667 A1* | 4/2018 | Lewis | G06F 16/24578 |

OTHER PUBLICATIONS

Imran, Muhammad, et al., "Processing Social Media Messages in Mass Emergency: A Survey", ACM Computing Surveys, vol. 47, No. 4, Article 67, Jun. 2015, 38 pages.*

Disclosed Anonymously et al., "System for Managing authored content over time taking into account specified individuals", An IP.com Prior Art Database Technical Disclosure, IP.com No. IPCOM000229387D, IP.com Electronic Publication Date: Jul. 26, 2013, 4 pages.

IBM Knowledge Center, "What do I need to know about using IBM Verse for Apple devices?", printed on Apr. 14, 2016, 1 page, <https://www.ibm.com/support/knowledgecenter/SSYRPW_9.0.1/iOSVerseNeedtoKNow.dita>.

Reed, Frank, "Facbook Looks to Improve News Feed Content Quality", Marketing Pilgrim, © 2005-2015 Marketing Pilgrim, posted, Aug. 26, 2013, 4 pages, <http://www.marketingpilgrim.com/2013/08/facebook-looks-to-improve-news-feed-content-quality.html>.

"Deep learning", From Wikipedia, the free encyclopedia, This page was last modified on Apr. 10, 2016, 18 pages, <https://en.wikipedia.org/wiki/Deep_learning>.

"Facebook Launches Advanced AI Effort to Find Meaning in Your Posts", posted by Timothy on Saturday Sep. 21, 2013, Copyright © 2016 SlashdotMedia, 11 pages, <https://tech.slashdot.org/story/13/09/21/1831239/facebook-launches-advanced-ai-effort-to-find-meaning-in-your-posts>.

"Release Blueprints", printed on Apr. 14, 2016, 1 page, <https://releaseblueprints.ibm.com/login.action?os_destination=/display/SFSB/Mail+Next>.

"SaneBox for Business", © Copyright 2016 SaneBox, Inc., 4 pages, <https://www.sanebox.com/business>.

"SocialMediaToday", © 2016 socialmediatoday.com, 4 pages, <https://www.sanebox.com/business>.

* cited by examiner

| USER | TYPE | WEIGHT |
|---|---|---|
| User 1 | Co-worker | 2.0 |
| User 2 | Other | 1.0 |
| User 3 | Family | 3.0 |
| User 4 | Co-worker | 2.0 |
| User 5 | Family | 3.0 |
| User 6 | Family | 3.0 |
| User 7 | Other | 1.0 |
| User 8 | Other | 1.0 |

| TYPE | WEIGHT |
|---|---|
| Reply | 2.0 |
| Share | 1.0 |
| Like | 1.0 |
| Flag | 3.0 |
| Report | 0.0 |

| INTERACTION | AGE | WEIGHT |
|---|---|---|
| User 1 Reply | 18 hours | 18/24 = 0.75 |
| User 2 Reply | 30 hours | 30/24 = 1.25 |
| User 3 Share | 16 hours | 16/24 = 0.67 |
| User 4 Like | 36 hours | 36/24 = 1.50 |
| User 2 Share | 40 hours | 40/24 = 1.67 |
| User 5 Flag | 12 hours | 12/24 = 0.50 |
| User 1 Reply 2 | 8 hours | 8/24 = 0.33 |

| UPDATE | SCORE |
|---|---|
| Update 1 | 11.41 |
| Update 2 | 1.93 |
| Update 3 | 30.0 |

SOCIAL NETWORK CONTENT PRIORITIZATION

BACKGROUND OF THE INVENTION

The present invention relates generally to the field of social networking, and more specifically to prioritizing social network content according to the content's value.

Social networking services are platforms that enable the creation of social networks or social relations among people who share similar interests, activities, backgrounds, or real-life connections. Mail clients and online social networks are the universal mechanism to connect people and information in logical and organized ways which enable sharing and processing of information between the users. Common mechanisms for sharing and processing information include inboxes, walls, activity streams, timelines, and profiles. These mechanisms enable a user to rapidly share information with others and gather information from other users in a network.

SUMMARY

As disclosed herein, a method includes receiving one or more social networking updates, identifying update information corresponding to each of the one or more social networking updates, wherein update information includes at least user information, interaction information, and time information, calculating a prioritization score for each of the one or more social networking updates according to the identified update information, prioritizing the one or more updates based on the calculated prioritization scores, and displaying the one or more updates according to the prioritization. A computer program product and computer system corresponding to the method are also disclosed.

DETAILED DESCRIPTION

In many cases, each user creates, reads, and responds to countless messages and other updates every day via social networking platforms. Many of these messages may be missed, ignored, or processed without a useful prioritization mechanism. Currently available techniques for prioritizing content may use simple filters to address content overload. However, these filters may require user creation and manipulation.

Figure 1:
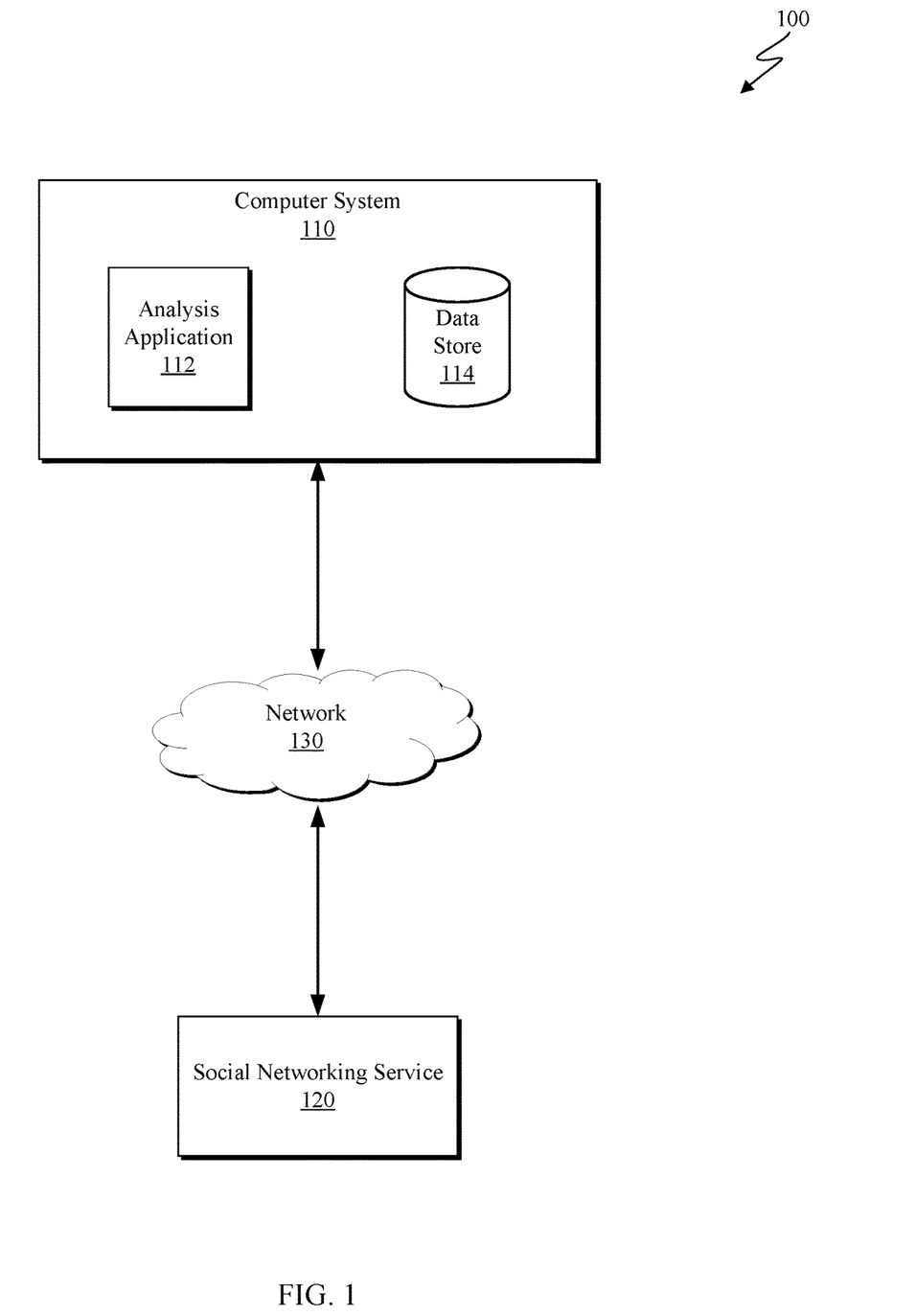
FIG. 1 is a block diagram depicting one embodiment of a social networking system in accordance with some embodiments of the present invention.

FIG. 1 is a block diagram depicting one embodiment of a social network analysis system 100 in accordance with some embodiments of the present invention. As depicted, social network analysis system 100 includes computer system 110, social network service 120, and network 130. Social network analysis system 100 may enable content analysis with respect to a user's social networking feed.

Computer system 110 can be a desktop computer, a laptop computer, a specialized computer server, or any other computer system known in the art. In some embodiments, computer system 110 represents a computer system utilizing clustered computers and components to act as a single pool of seamless resources. In general, computer system 110 is representative of any electronic device, or combination of electronic devices, capable of executing machine-readable program instructions, as described in greater detail with regard to FIG. 4.

As depicted, computer system 110 includes analysis application 112 and data store 116. Analysis application 112 may be configured to receive social networking updates from social network service 120 via network 130. In one or more embodiments, analysis application 112 is configured to execute a content prioritization method on the received social networking updates. One example of an appropriate content analysis method is described with respect to FIG. 2.

Data store 116 may be configured to store social networking update content. In some embodiments, data store 116 is configured to store scoring and prioritization information with respect to a plurality of social networking updates. Data store 116 may be any non-volatile storage media known in the art. For example, data store 116 can be implemented with a tape library, optical library, one or more independent hard disk drives, or multiple hard disk drives in a redundant array of independent disks (RAID). Similarly, data on data store 116 may conform to any suitable storage architecture known in the art, such as a file, a relational database, an element-oriented database, and/or one or more tables.

Social network service 120 may be any platform through which social networks or social relations are made. In some embodiments, social network service 120 is a web-based service which provides means for users to interact over the internet, utilizing features such as emailing and instant messaging. Social network service 120 may provide social networking updates to computer system 110 via network 130.

Figure 2:
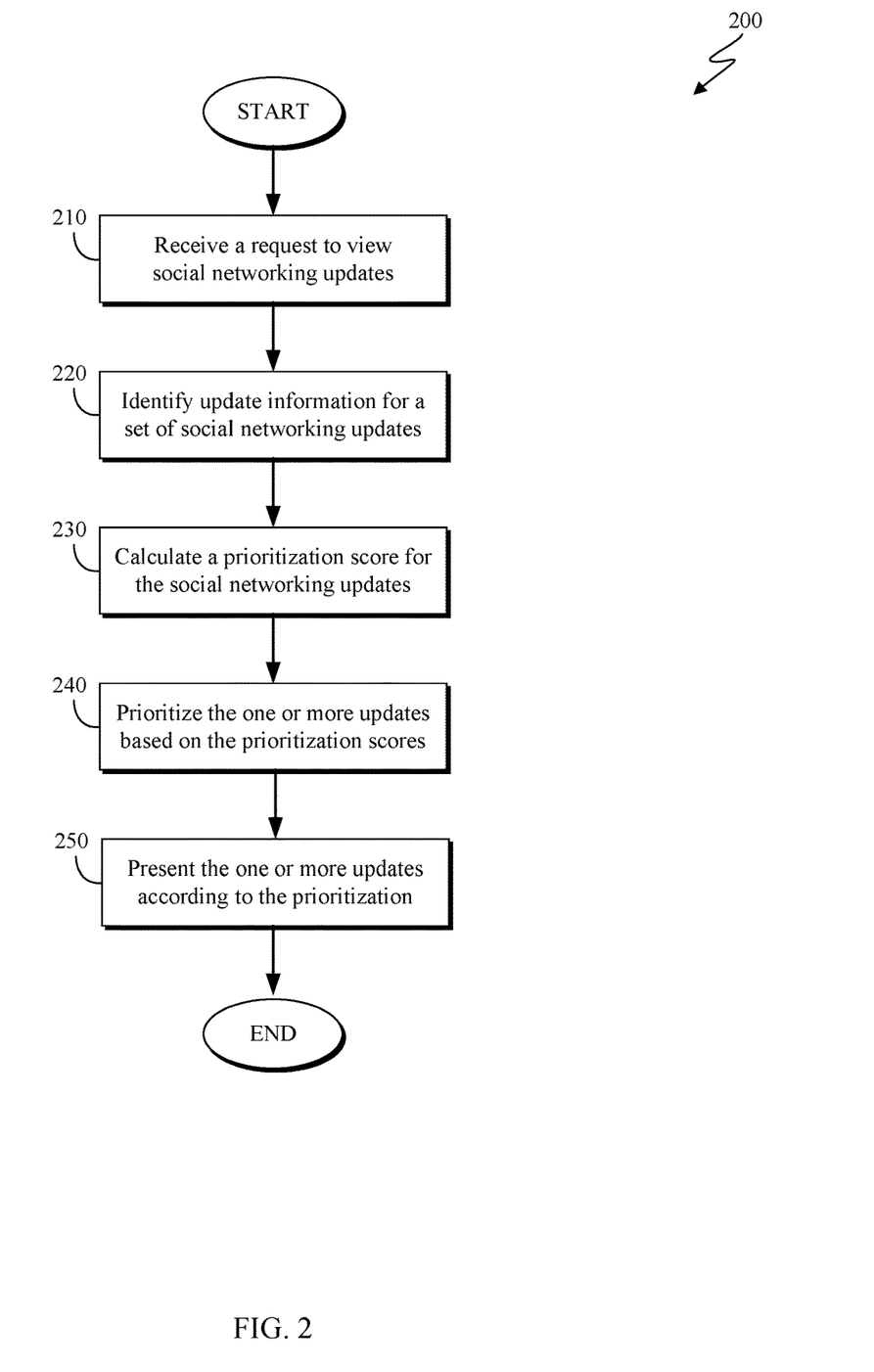
FIG. 2 is a flowchart depicting one embodiment of a content analysis method in accordance with at least one embodiment of the present invention.

FIG. 2 is a flowchart depicting one example of a content prioritization method 200 in accordance with one or more embodiments of the present invention. As depicted, content prioritization method 200 includes receiving (210) a request to view social network updates, identifying (220) update information corresponding to one or more social network updates, calculating (230) a prioritization score for each of the one or more social network updates, prioritizing (240) the one or more updates according to the calculated wave scores, and presenting (250) the one or more updates according to the prioritization. Content prioritization method 200 may enable a user to save time when viewing social networking updates by displaying the updates that are most likely to be of interest to the user first.

Receiving (210) a request to view social network updates may include receiving a user initiated request for social networking updates to be displayed. In one embodiment, receiving (210) a request to view social network updates comprises a user simply logging into his/her social networking account or accessing a social networking service while already logged in. In said embodiment, the user may navigate to an activity stream to prompt the receipt of the request to view social network updates. In other embodiments, receiving (210) a request to view social network updates includes detecting that the user has opened an application configured to display social networking updates. Receiving (210) a request to view social network updates may include receiving a request via a user interface comprising an icon, menu, or other means for the user to interact with the application.

Identifying (220) update information for each of one or more social network updates may include receiving one or more social network updates from a social networking service. The one or more social network updates may correspond to updates provided by other users with whom the user has established a connection. In one or more embodiments, identifying (220) update information for each of one or more social network updates includes monitoring each of the updates for subsequent actions corresponding to the update. The subsequent actions may include, but are not limited to, read, comment, like, share, reply, flag, or report. For each of these actions, update information and associated user information is added to a data store. In one or more embodiments, the update information includes information corresponding to the user who created the update, any users who interacted with the update, the type of interaction each user had with the update, and associated timing information associated with any interactions with the update. The update information may be stored in such a way that the update information can be quickly retrieved when queried.

Calculating (230) a prioritization score for each of the one or more social network updates may include determining a prioritization score for an update according to interaction information. In one or more embodiments, the prioritization score is calculated in a manner so as to reflect a growing importance of an update corresponding to a plurality of interactions with the update. The prioritization score may further be calculated in a manner such that the prioritization of an update diminishes as interactions with the update decrease and the message grows older.

The prioritization score may be calculated according to a multitude of diverse factors. In one or more embodiments, the prioritization score may be based on the type of interaction(s) corresponding to the update. For example, a user commenting on an update may be scaled to impact the prioritization score more than a user sharing the update would. A user hierarchy may be used to calculate the prioritization score for an update. For example, an interaction conducted by the user's boss may be scaled to impact the prioritization score of the update more than an interaction by another user whose relationship to the user is either undefined or is given lower priority. Other users in the user's network may be categorized, and each user category may be given a weight. In some embodiments, users have an interface through which they can signify a prioritization value. For example, when interacting with an update, users may have the opportunity to assign a custom prioritization value associated with their interaction. The prioritization score may be calculated with respect to the ratio of the number of users who interacted with an update to the number of users who viewed the update. In some embodiments, the prioritization score is calculated with respect to the age of the update, wherein the age of the update is defined as the amount of time that has passed since the update was created. In other embodiments, the prioritization score is calculated with respect to the age of the most recent interaction with the update. The prioritization score may be inversely correlated with the age of the update or a most recent interaction with the update.

Prioritizing (240) the one or more updates according to the calculated prioritization scores may include determining an order for the one or more updates according to the calculated prioritization scores. In one or more embodiments, the updates are ordered from the highest priority score to the lowest priority score. Prioritizing (240) the one or more updates may include placing the updates into one or more tiers based on the prioritization scores. In some embodiments, these tiers may correspond to a number of updates that can be displayed to a user via a single screen or page. For example, if an application is configured to display 12 updates to a user at a time, then the updates may be prioritized into tiers of 12 updates each, wherein the first tier corresponds to the 12 updates with the 12 highest prioritization scores, and so on. In said embodiments, the updates may be displayed in order of prioritization score, or may be displayed in no particular order within tiers.

Presenting (250) the one or more updates according to the prioritization may include displaying the updates in order of priority. In one or more embodiments, the updates are displayed according to the determined priority tiers. The updates may be presented to the user via a computer system, mobile device, or other device capable of accessing social networking services. In one or more embodiments the updates are presented to the user via an activity stream or a similar mechanism corresponding to a social networking service.

Figure 3A:
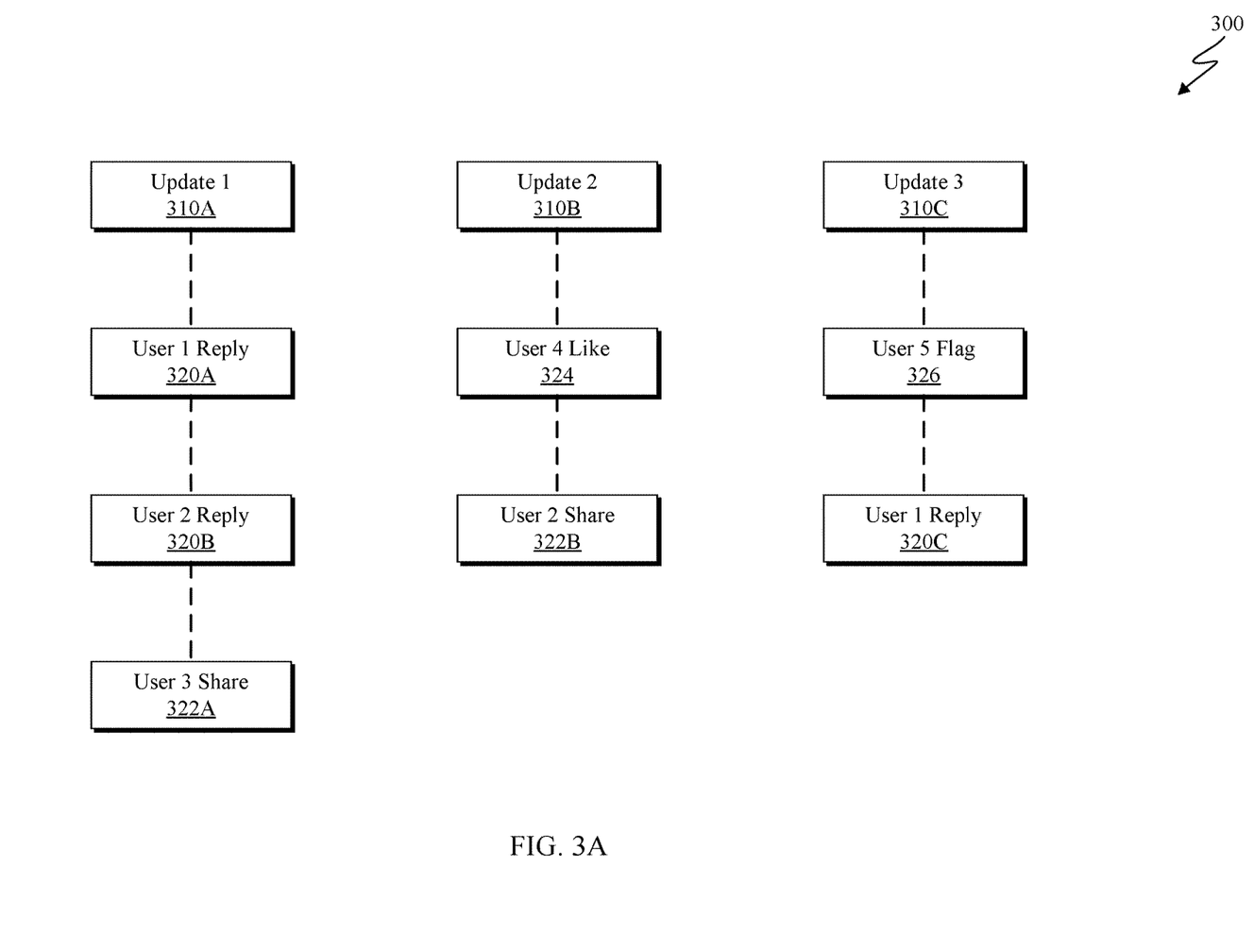
FIG. 3A depicts example social networking updates and corresponding user interactions in accordance with at least one embodiment of the present invention.

FIG. 3A depicts a set of social networking updates 310 and corresponding user interactions in accordance with at least one embodiment of the present invention. As depicted, the corresponding user interactions include replies 320, shares 322, like 324, and flag 326. Each interaction corresponds to one of the social networking updates 310; specifically, replies 320A and 320B and share 322A correspond to update 310A, like 324 and share 322B correspond to update 310B, and flag 326 and reply 320C correspond to update 310C. Social networking updates 310 correspond to a set of social networking updates that may be prioritized using a content prioritization method such as the one discussed with respect to FIG. 2.

Figure 3B:
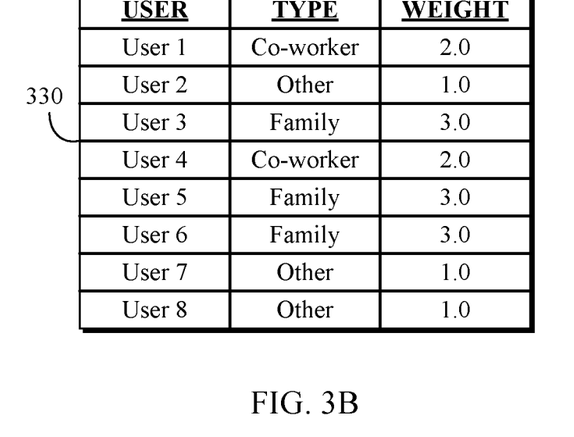
FIG. 3B is a table depicting user types and corresponding user weights in accordance with at least one embodiment of the present invention.

FIG. 3B is a user table 330 depicting user types and corresponding user weights in accordance with at least one embodiment of the present invention. User table 330 corresponds to the social networking updates 310 as depicted with respect to FIG. 3A. As depicted, user table 330 includes three columns; the first column corresponds to other users from within the user's network, the second column corresponds to a user type, which indicates a group the user other users belong to, and the third column corresponds to a weight associated with each indicated user. In this example, the user weight is influenced only by the determined user type. As depicted, there are eight rows corresponding to eight users from within the user's network. User table 330 is an example of a table which may be queried to identify a user component of an update's prioritization score.

Figure 3C:
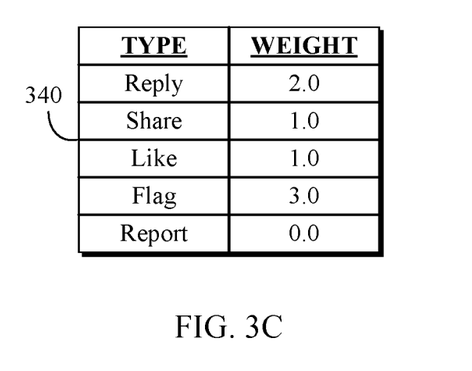
FIG. 3C is a table depicting interaction types and corresponding interaction weights in accordance with at least one embodiment of the present invention.

FIG. 3C is an interaction table 340 depicting interaction types and corresponding interaction weights in accordance with at least one embodiment of the present invention. Interaction table 340 corresponds to the interactions depicted with respect to FIG. 3A. As depicted, interaction table 340 includes two columns; the first column corresponds to an interaction type corresponding to interactions another user may have with a selected update within a social network, and the second column corresponds to a weight associated with each indicated interaction type. As depicted, there are five rows corresponding to five available user interactions within the social network. Interaction table 340 is an example of a table which may be queried to identify an interaction component of an update's prioritization score.

Figure 3D:
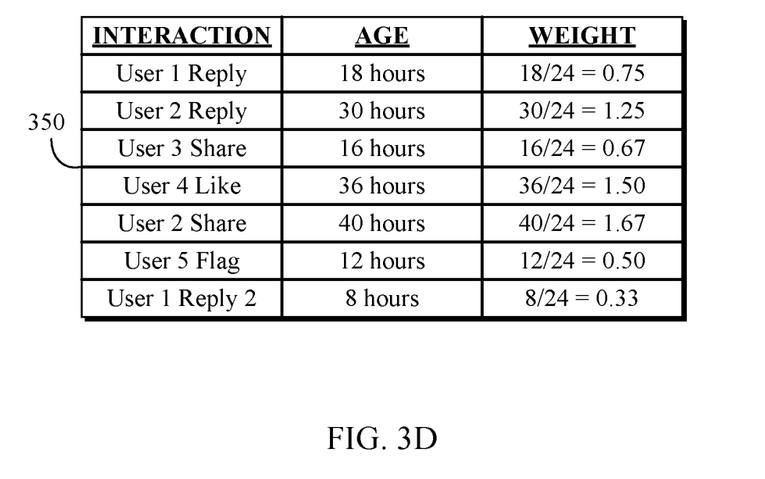
FIG. 3D is an update age table depicting the age of each update and corresponding age weights in accordance with at least one embodiment of the present invention.

FIG. 3D is an update age table 350 depicting the age of each update and corresponding age weights in accordance with at least one embodiment of the present invention. Update age table 350 corresponds to the social networking updates 310 depicted with respect to FIG. 3A. As depicted, update age table 350 includes three columns; the first column corresponds to one of the social networking updates 310, the second column corresponds to the age of the update indicated by the first column, and the third column corresponds to a weight associated with each indicated update age. As depicted, each age is rounded to the nearest hour, and the age weight is calculated as a fraction of a day by dividing the age by 24 hours. Update age table 350 is an example of a table which may be queried to identify an age component of an update's prioritization score.

Figure 3E:
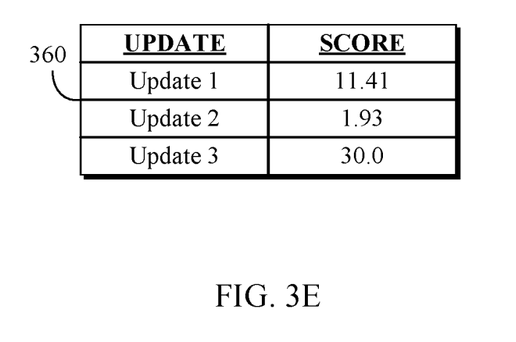
FIG. 3E is a table depicting update scores in accordance with at least one embodiment of the present invention.

FIG. 3E is an update table 360 depicting update scores in accordance with at least one embodiment of the present invention. Update table 360 corresponds to the social networking updates 310 as depicted with respect to FIG. 3A. As depicted, update table 360 includes two columns; the first column corresponds to updates from a received set of social networking updates, and the second column corresponds to a calculated prioritization score with respect to each update. In the depicted embodiment, the prioritization score is calculated according to the equation:

$$P=(X_1*Y_1)/Z_1+(X_2*Y_2)/Z_2+\ldots+(X_N*Y_N)/Z_N$$

With respect to equation (1), P corresponds to a prioritization score for an update, $X_a$ corresponds to the user weight of the $a^{th}$ interaction, $Y_a$ corresponds to the interaction weight of the $a^{th}$ interaction, $Z_a$ corresponds to the age weight of the $a^{th}$ interaction, and N corresponds to the total number of interactions associated with the update. The prioritizations calculated according to equation 1 with respect to user table 330, interaction table 340, and update age table 350 are depicted in the second column of update table 360.

Figure 3F:
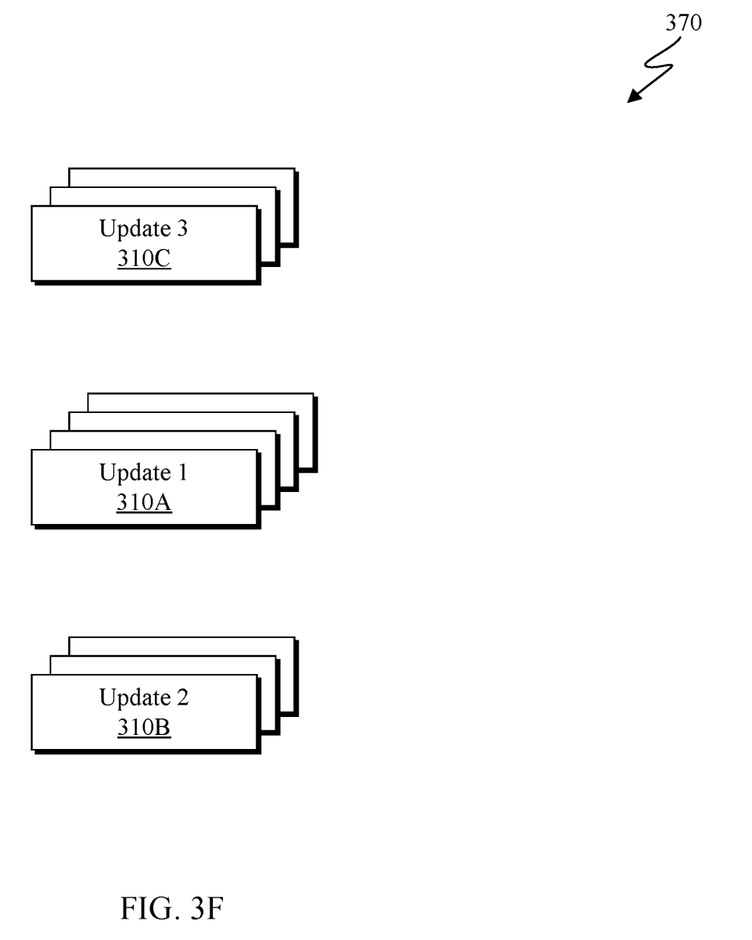
FIG. 3F depicts prioritized updates in an activity stream in accordance with at least one embodiment of the present invention.

FIG. 3F depicts prioritized updates in an activity stream 370 in accordance with at least one embodiment of the present invention. As depicted, activity stream 370 includes social networking updates 310 sorted according to their corresponding prioritization scores as depicted with respect to update table 360 in FIG. 3E. In the depicted embodiment, social networking updates 310 are displayed to the user, and the corresponding interactions are cascaded behind the updates such that the user may easily access and view them. As depicted, update 310C is displayed to the user first, update 310A is displayed second, and update 310B is displayed third.

Figure 4:
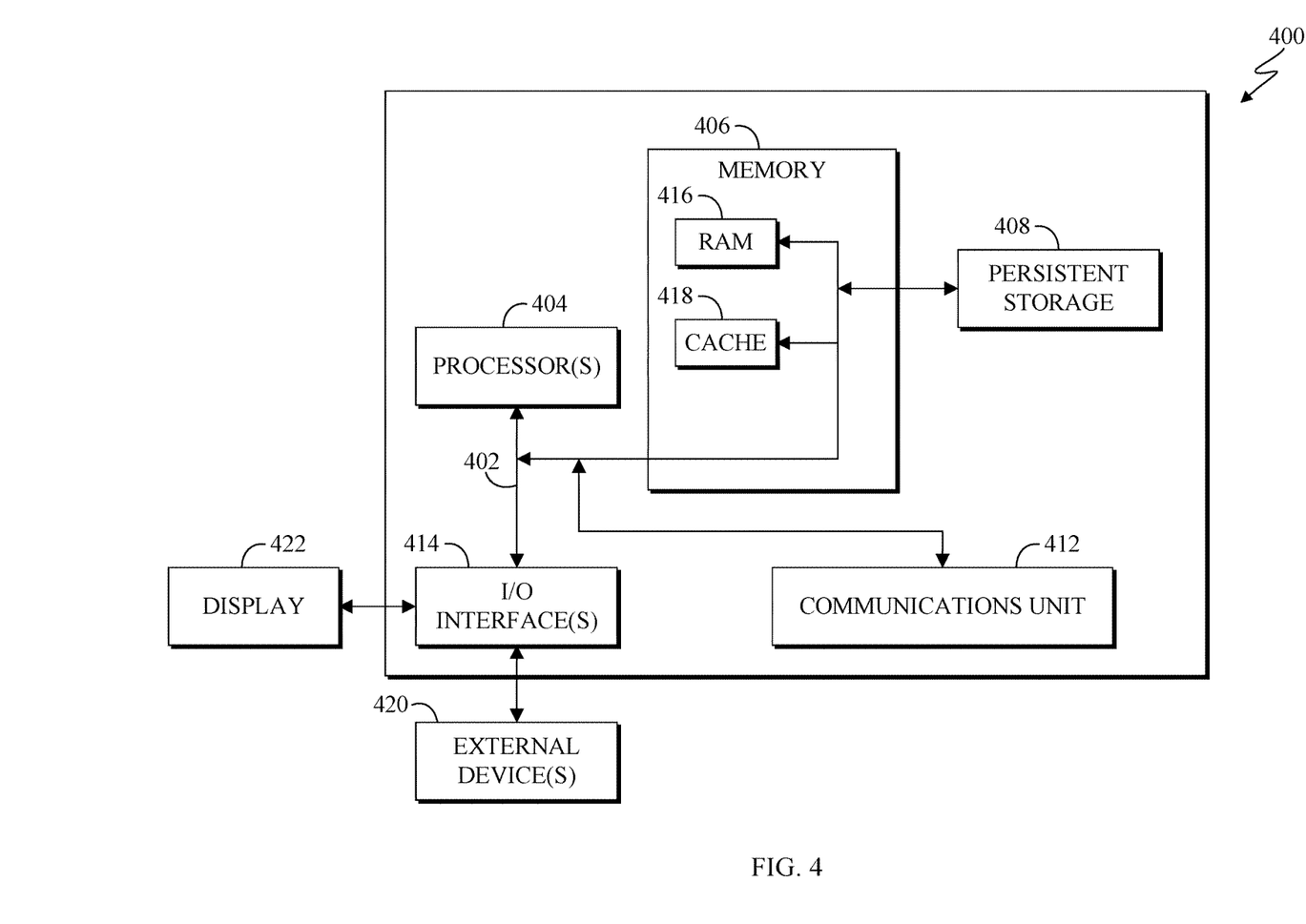
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving one or more social networking updates;
   identifying update information corresponding to each of the one or more social networking updates, wherein update information includes at least user information, interaction information, and time information;
   identifying a user hierarchy according to the user information, wherein the user hierarchy indicates users from within a network whose content should be prioritized over content from other users;
   calculating a prioritization score for each of the one or more social networking updates according to the identified update information and the identified user hierarchy, wherein the prioritization score indicates an importance of a corresponding social networking update;
   prioritizing the one or more updates based on the calculated prioritization scores; and
   displaying the one or more updates according to the prioritization.

2. The method of claim 1, wherein the prioritization score of an update is inversely correlated with an age of the update.

3. The method of claim 1, wherein interaction information for an update indicates a user who created an interaction, an interaction type, and an interaction age.

4. The method of claim 3, wherein interaction information for an update further comprises a user weight.

5. The method of claim 3, wherein interaction information for an update further comprises an interaction weight.

6. The method of claim 3, wherein interaction information for an update further comprises an age weight.

7. The method of claim 1, wherein the prioritization score of an update is directly correlated with a number of interactions associated with the update.

8. A computer program product comprising:
   one or more computer readable storage media and program instructions stored on the one or more computer readable storage media, the program instructions comprising instructions to:
   receive one or more social networking updates;
   identify update information corresponding to each of the one or more social networking updates, wherein update information includes at least user information, interaction information, and time information;
   identify a user hierarchy according to the user information, wherein the user hierarchy indicates users from within a network whose content should be prioritized over content from other users;
   calculate a prioritization score for each of the one or more social networking updates according to the identified update information and the identified user hierarchy, wherein the prioritization score indicates an importance of a corresponding social networking update;
   prioritize the one or more updates based on the calculated prioritization scores; and
   display the one or more updates according to the prioritization.

9. The computer program product of claim 8, wherein the prioritization score of an update is inversely correlated with an age of the update.

10. The computer program product of claim 8, wherein interaction information for an update indicates a user who created an interaction, an interaction type, and an interaction age.

11. The computer program product of claim 10, wherein interaction information for an update further comprises a user weight.

12. The computer program product of claim 10, wherein interaction information for an update further comprises an interaction weight.

13. The computer program product of claim 10, wherein interaction information for an update further comprises an age weight.

14. The computer program product of claim 8, wherein the prioritization score of an update is directly correlated with a number of interactions associated with the update.

15. A computer system comprising:
   one or more computer processors;
   one or more computer-readable storage media;
   program instructions stored on the computer-readable storage media for execution by at least one of the one or more processors, the program instructions comprising instructions to:
   receive one or more social networking updates;
   identify update information corresponding to each of the one or more social networking updates, wherein update information includes at least user information, interaction information, and time information;
   identify a user hierarchy according to the user information, wherein the user hierarchy indicates users from within a network whose content should be prioritized over content from other users;
   calculate a prioritization score for each of the one or more social networking updates according to the identified update information and the identified user hierarchy, wherein the prioritization score indicates an importance of a corresponding social networking update;
   prioritize the one or more updates based on the calculated prioritization scores; and
   display the one or more updates according to the prioritization.

16. The computer system of claim 15, wherein the prioritization score of an update is inversely correlated with an age of the update.

17. The computer system of claim 15, wherein interaction information for an update indicates a user who created an interaction, an interaction type, and an interaction age.

18. The computer system of claim 17, wherein interaction information for an update further comprises a user weight.

19. The computer system of claim 17, wherein interaction information for an update further comprises an interaction weight.

20. The computer system of claim 17, wherein interaction information for an update further comprises an age weight.

* * * * *